United States Patent
de Ojeda et al.

(10) Patent No.: US 7,013,212 B1
(45) Date of Patent: Mar. 14, 2006

(54) AIR MANAGEMENT STRATEGY FOR AUTO-IGNITION IN A COMPRESSION IGNITION ENGINE

(75) Inventors: William de Ojeda, Chicago, IL (US); Xilin Yang, Mason, OH (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/974,639

(22) Filed: Oct. 27, 2004

(51) Int. Cl.
*F02D 41/34* (2006.01)
*G06F 19/00* (2006.01)

(52) U.S. Cl. .................................................. 701/103
(58) Field of Classification Search ................ 701/103, 701/115, 102; 123/90.11, 90.12, 90.15, 295, 123/480
See application file for complete search history.

(56) References Cited

U.S. PATENT DOCUMENTS

| | | | |
|---|---|---|---|
| 6,044,815 A | 4/2000 | de Ojeda | |
| 6,263,842 B1 | 7/2001 | de Ojeda et al. | |
| 6,550,444 B1 * | 4/2003 | Shiraishi et al. | 123/90.11 |

FOREIGN PATENT DOCUMENTS

EP     1 245 811 A2 *  2/2002

OTHER PUBLICATIONS

Goto, Tsuyoshi; Koichi Hatamura; Shinobu Takizawa; Nobuhiro Hayama; Hiroshi Abe; and Hiroshi Kanesaka, "Development of V6 Miller Cycle Gasoline Engine," SAE Paper No. 940198, International Congress & Exposition, Feb. 28-Mar. 3, 1994, SAE International, Warrendale, PA.
Agrell, Fredrik; Hans-Erik Ångström; Bengt Eriksson; Jan Wikander; and Johan Linderyd, "Integrated Simulation and Engine Test of Closed Loop HCCI Control by Aid of Variable Valve Timings," SAE Paper No. 2003-01-0748, 2003 SAE World Congress, Mar. 3-6, 2003, SAE International, Warrendale, PA.
Wolters, P.; W. Salber; J. Geiger; M. Duesmann; and J. Dilthey, "Controlled Auto Ignition Combustion Process with an Electromechanical Valve Train," SAE Paper No. 2003-01-0032, 2003 SAE World Congress, Mar. 3-6, 2003, SAE International, Warrendale, PA.

* cited by examiner

*Primary Examiner*—Hieu T. Vo
(74) *Attorney, Agent, or Firm*—Dennis Kelly Sullivan; Susan L. Lukasik; Jeffrey P. Calfa

(57) ABSTRACT

A compression ignition engine (10) has a control system (24) for processing data, one or more cylinders (16), a fueling system (18), and a variable valve actuation mechanism (20). Control system (24) develops both fueling data for fueling the engine and timing data representing time during the engine cycle for intake valve closure to a cylinder that will endow the cylinder with an effective compression ratio (ECR) appropriate to current engine operation for causing auto-ignition to occur near or at top dead center in the engine cycle. During a compression upstroke, the cylinder is fueled according to the fueling data and intake valve closure for the cylinder is performed according to the timing data. This creates an air-fuel mixture that is increasingly compressed to the point of auto-ignition near or at top dead center.

13 Claims, 3 Drawing Sheets

AIR MANAGEMENT STRATEGY FOR AUTO-IGNITION IN A COMPRESSION IGNITION ENGINE

FIELD OF THE INVENTION

This invention relates generally to internal combustion engines of the compression ignition type. More specifically it relates to an air management strategy for securing desired auto-ignition when a diesel engine is operating by an alternative combustion process such as HCCI, CAI, DCCS, or HPCS.

BACKGROUND OF THE INVENTION

HCCI (homogeneous charge compression ignition) is a recognized process for fueling a diesel engine in a manner that creates a substantially homogeneous air-fuel charge inside an engine cylinder during a compression upstroke of an engine cycle. After a desired quantity of fuel for the charge has been injected into the cylinder to create a generally homogeneous air-fuel mixture, the increasing compression of the charge by the upstroking piston creates sufficiently large pressure to cause auto-ignition of the charge near or at top dead center (TDC). Auto-ignition may occur as the substantially simultaneous spontaneous combustion of vaporized fuel at various locations within the mixture.

One of the attributes of HCCI is that relatively lean, or dilute, mixtures can be combusted, keeping the combustion temperatures relatively low. By avoiding the creation of relatively higher combustion temperatures, HCCI can yield significant reductions in the generation of NOx, an undesired constituent of engine exhaust gas.

Another attribute of HCCI is that auto-ignition of a substantially homogeneous air-fuel charge generates more complete combustion and consequently relatively less soot in engine exhaust.

The potential benefit of HCCI on reducing tailpipe emissions is therefore rather significant, and consequently HCCI is a subject of active investigation and development by many scientists and engineers in the engine research and design community.

HCCI may be considered one of several alternative combustion processes for a compression ignition engine. Other processes that may be considered alternative combustion processes include Controlled Auto-Ignition (CAI), Dilution Controlled Combustion Systems (DCCS), and Highly Premixed Combustion Systems (HPCS).

By whatever name an alternative combustion system or process may be called, a common attribute is that fuel is injected into a cylinder well before TDC to form an air-fuel charge that is increasingly compressed until auto-ignition occurs near or at top dead center (TDC).

If such alternative processes are not suitable over the full range of engine operation for any particular engine, the engine may be fueled in the traditional conventional diesel manner where charge air is compressed to the point where it causes the immediate ignition of fuel upon fuel being injected into a cylinder, typically very near or at top dead center where compression is a maximum.

With the availability of processor-controlled fuel injection systems capable of controlling fuel injection with precision that allows fuel to be injected at different injection pressures, at different times, and for different durations during an engine cycle over the full range of engine operation, a diesel engine becomes capable of operating by alternative combustion processes and/or traditional diesel combustion.

The advent of variable valve actuation systems allows timing of engine valves to be processor-controlled in various ways, and with precision. As will be explained by later description, the present invention takes advantage of the capabilities of such variable valve actuation systems to control effective compression ratio in ways that can improve a diesel engine by significant reductions in engine-out emissions. Some modes of valve actuation may even be accompanied by modest fuel economy improvements.

Because a diesel engine that powers a motor vehicle runs at different speeds and loads depending on various inputs to both the vehicle and the engine that influence engine operation, fueling requirements change as speed and load change. An associated processing system processes data indicative of parameters such as engine speed and engine load to develop control data for setting desired engine fueling for particular operating conditions that will assure proper control of the fuel injection system for various combinations of engine speed and engine load.

A variable valve actuation system can also be controlled in different ways according to engine speed-load conditions to provide effective compression ratio appropriate to those conditions. Proper control of effective compression ratio is important in securing the best engine performance while complying with applicable engine-out emission specifications.

SUMMARY OF THE INVENTION

It has been discovered that air management is a significant factor in achieving auto-ignition at a desired time during the engine cycle when a diesel engine is operating by an alternative combustion process. The availability of processor-controlled variable valve actuation systems can operate engine valves in ways for managing airflow into the cylinders to achieve desired effective compression ratio. As engine operating conditions change, effective compression ratio can be changed in ways appropriate for changing conditions.

HCCI, DCCS, HPCS, and other alternative internal combustion processes have disclosed, both theoretically and experimentally, the possibility of significant reductions in engine-out emission level, including NOx and soot. One of the factors that can be used effectively for accomplishing these reductions is effective compression ratio.

It is believed that an industry-accepted definition for effective compression ratio is the ratio of in-cylinder pressure at the end of a compression stroke to the in-cylinder pressure at the end of an effective intake stroke. For purposes of the present invention, effective compression ratio will be designated as ECR and defined as the ratio of the in-cylinder pressure at TDC to pressure in the intake manifold, which in the case of a turbocharged engine is boost pressure, or simply boost.

The present invention relates to the use of variable valve actuation strategy for effective ECR control to achieve desired in-cylinder temperature at commencement of combustion when an engine operates by an alternative combustion process such as those mentioned earlier. While a principal benefit of the invention is reduction in engine-out emissions, it is contemplated that the invention can make a contribution toward improvement in other aspects of engine performance in a motor vehicle, such as gains in fuel economy, noise reduction, and better cold-starting and drivability. Moreover, the invention can be embodied in a cost-effective manner in production vehicles that already have electronic engine control systems and variable valve actuation systems.

Various mechanisms that are disclosed in various patents and technical literature may be used to induce change in ECR of an engine. Examples that are suitable for practice of the present invention are described in commonly owned U.S. Pat. Nos. 6,044,815 and 6,263,842. They comprise hydraulically-assisted engine valve actuators that can change individual valves and control individual cylinders for better combustion control and that are useful in compensating for different charge temperatures resulting from different cylinder locations in an engine.

The present invention relates to an engine, system, and method for enhancing the use of alternative combustion processes in a diesel engine toward objectives that include further reducing the generation of undesired constituents in engine exhaust, especially soot and $NO_X$. The invention is embodied in an air management strategy that involves the use of variable valve actuation in a novel way to control ECR for achieving in-cylinder temperatures suitable for commencement of auto-ignition at desired times in an engine cycle that will provide acceptable engine performance in conjunction meaningful reductions in engine-out emissions, especially NOx and soot.

The strategy can be implemented by suitable programming in an associated processing system of an engine control system.

One generic aspect of the present invention relates to a method of operating a compression ignition engine that has a processor-based engine control system controlling both a fueling system for fueling the engine and a variable valve actuation system that controls operation of intake valves that open and close an intake system to individual engine cylinders.

The method comprises processing certain data to develop both fueling data for fueling an engine cylinder and intake valve operating data for operating an intake valve for the cylinder. The intake valve operating data is developed by execution of an algorithm in the control system that controls ECR of the cylinder for causing commencement of auto-ignition of fuel in the cylinder to occur during a compression stroke in advance of top dead center at an in-cylinder temperature within a defined temperature range. The cylinder is fueled according to the fueling data.

The variable valve actuation system is controlled according to the intake valve operating data to allow air to pass from the intake system through the intake valve into the cylinder in an amount that causes commencement of auto-ignition of fuel in the cylinder to occur during the compression stroke in advance of top dead center at an in-cylinder temperature within the defined temperature range.

A further generic aspect relates to a compression ignition engine comprising cylinders within which combustion occurs to run the engine, a fueling system for fueling the cylinders, an intake system for introducing charge air into the cylinders, including a variable valve actuation system that controls operation of intake valves that open and close the intake system to individual engine cylinders, and a processor-based engine control system controlling both the fueling system and the variable valve actuation system.

The processing portion of the control system processes certain data to develop fueling data for fueling the engine cylinders and intake valve operating data for operating the cylinder intake valves.

The intake valve operating data is developed by execution of an algorithm in the control system that controls ECR of the cylinders for causing commencement of auto-ignition of fuel in the cylinders to occur during compression strokes in advance of top dead center at in-cylinder temperatures within a defined temperature range.

A more specific aspect of both the method and engine is that the intake valves begin to open at or near the beginning of an intake stroke immediately preceding the compression stroke and close before the conclusion of the intake stroke. The closing occurs sufficiently before the conclusion of the intake stroke to allow expansion of in-cylinder air during the remainder of the intake stroke sufficient to create some decrease in in-cylinder temperature.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
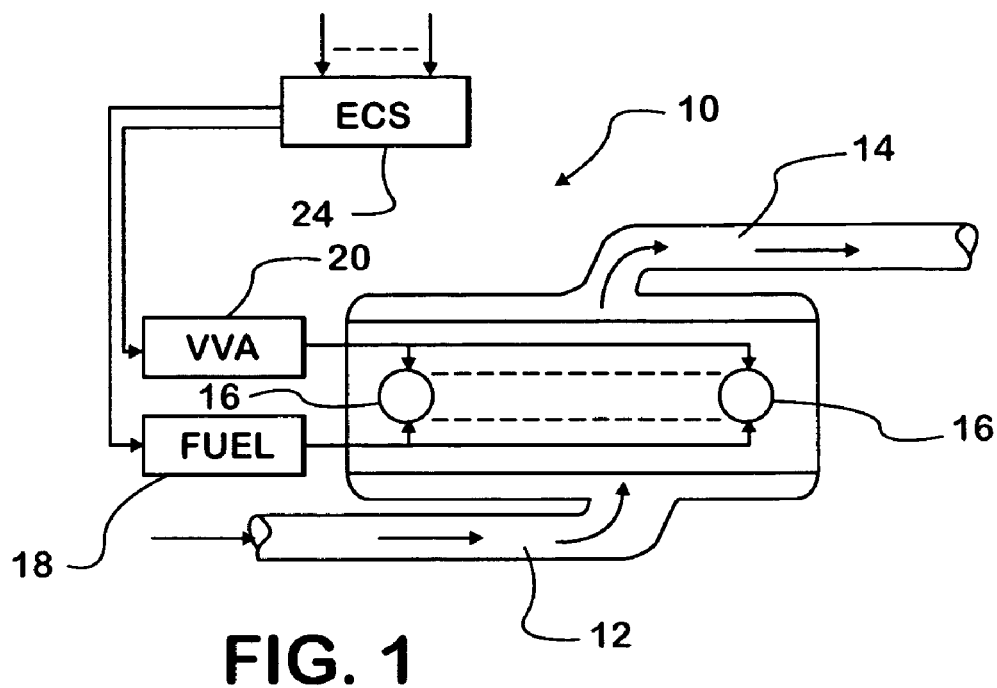
FIG. 1 is a schematic portrayal of portions of an engine relevant to principles of the invention.

FIG. 1 shows portions of an exemplary internal combustion engine 10 that embodies principles of the present invention. Engine 10 comprises an intake system 12 through which charge air for combustion enters the engine and an exhaust system 14 through which exhaust gases resulting from combustion exit the engine. Engine 10 operates on the principle of compression ignition, not spark ignition, and is turbocharged by a turbocharger that is not specifically shown. When used as the prime mover of a motor vehicle, such as a truck, engine 10 is coupled through a drivetrain to driven wheels that propel that the vehicle.

Engine 10 comprises multiple cylinders 16 (either in an in-line configuration of a V-configuration) forming combustion chambers into which fuel is injected by fuel injectors of a fuel system 18 to mix with charge air that has entered through intake system 12. Pistons that reciprocate within cylinders 16 are coupled to an engine crankshaft.

An air-fuel mixture in each cylinder 16 combusts under pressure created by the corresponding piston as the engine cycle passes from its compression phase to its power phase, thereby driving the crankshaft, which in turn delivers torque through the drivetrain to the wheels that propel the vehicle. Gases resulting from combustion are exhausted through exhaust system 14.

Engine 10 has intake and exhaust valves associated with cylinders 16. A variable valve actuation system 20 opens and closes at least the intake valves and may also open and close the exhaust valves. Each cylinder has at least one intake valve and at least one exhaust valve.

Engine 10 also comprises an engine control system (ECS) 24 that comprises one or more processors that process various data to develop data for controlling various aspects of engine operation. ECS 24 acts via appropriate interfaces with both fuel system 18 and variable valve actuation system 20 to control the timing and amount of fuel injected by each fuel injector and at least the opening and closing of the intake valves, possibly the opening and closing of the exhaust valves, too.

Figure 2:
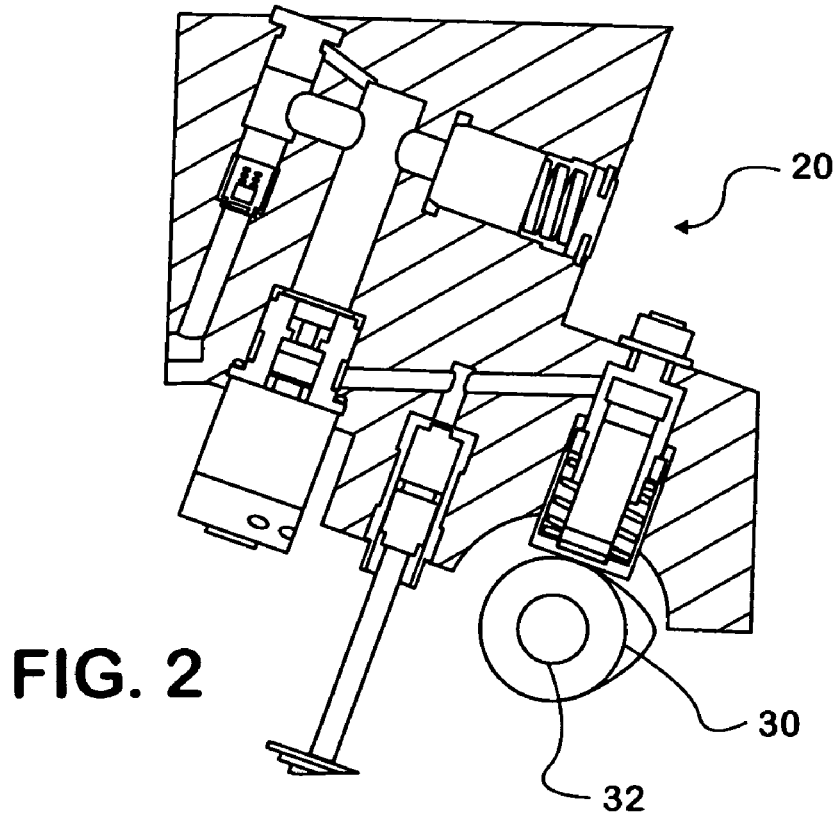
FIG. 2 is a cross section view of a portion of a variable valve actuation system of the engine.

A portion of a representative variable valve actuation system 20 in FIG. 2 is shown in association with a cam 30 on an engine camshaft 32. This portion of the system includes devices that allow the basic valve operating profile provided by system 20 to be adjusted for each particular cylinder to compensate for cylinder-to-cylinder temperature variations due to the particular location of a cylinder in an engine. A paper by C. Vafidis, "The Application of an Electro-Hydraulic VVA System on a Passenger Car C.R. Diesel Engine", (ATA 20A2011), describes the design of FIG. 2. The paper was presented at the ATA (Associacioni Tecnica De Automobile) Congress on The Future of Diesel Engine Technology for Passenger Cars, Porto Cervo, Italy, 12–13 Oct. 2000.

Figure 3:
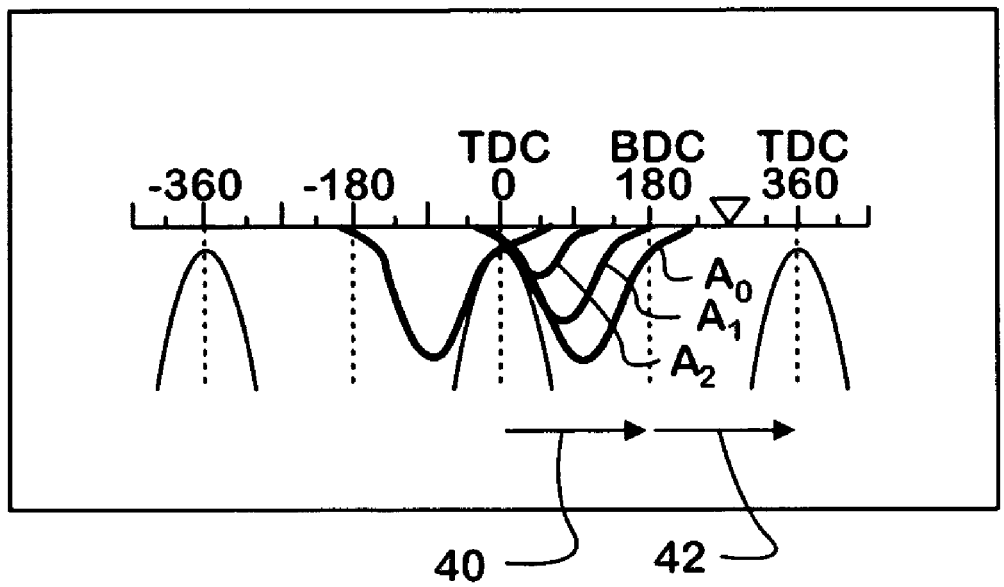
FIG. 3 is a graph plot showing several representative intake valve operating profiles.

FIG. 3 shows three representative intake valve profiles $A_0$, $A_1$, $A_2$. Profile $A_0$ has the largest lift and longest duration. Profile $A_2$ has the smallest lift and shortest duration. All three profiles show that intake valve opening begins at or near the beginning of an intake stroke 40 immediately preceding a compression stroke 42. Profiles $A_1$ $A_2$, show intake valve closing before the conclusion of the intake stroke 40. Profile $A_0$ shows intake valve closing after the conclusion of the intake stroke 40. In other words, for this particular variable valve actuation system, the larger the intake valve lift, the later the intake valve closing.

For a given pressure in the engine intake system upstream of the intake valves, each profile will allow a respective mass of air to enter each cylinder. Hence, the later that an intake valve closes, the larger the amount of air in the cylinder, at least up to bottom dead center (BDC) between the intake and compression strokes.

In accordance with certain principles of the invention, closing an intake valve sufficiently before the conclusion of the intake stroke allows expansion of in-cylinder air during the remainder of the intake stroke as the volume increases toward maximum at BDC. A sufficient amount of expansion will create some decrease in in-cylinder temperature because the energy of expansion is extracted from the thermal energy of the trapped in-cylinder air. Hence, by varying intake valve operation to vary the amount of temperature decrease, some degree of control over the in-cylinder temperature becomes possible. The ability to control in-cylinder temperature in this way is used in the practice of the present invention.

Figure 4:
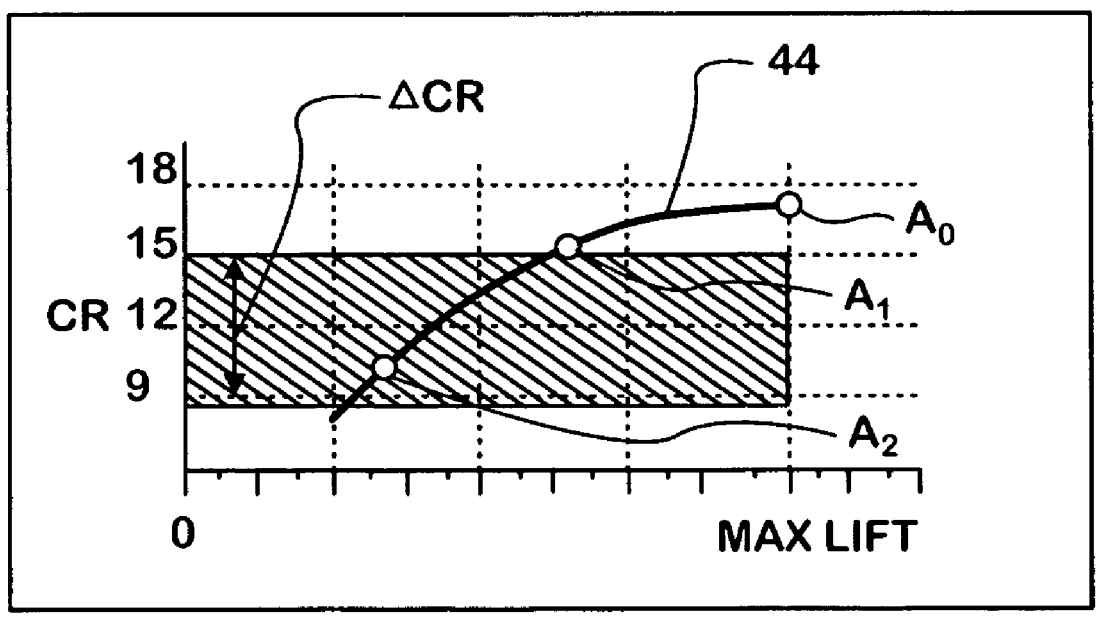
FIG. 4 is a graph plot shows certain relationships between ECR and the representative profiles of FIG. 3.

Varying intake valve operation in this way varies ECR. FIG. 4 shows an example of a range of auto-ignition with respect to the relation between ECR and intake valve The correlation of each of the three intake valve profiles $A_0$, $A_1$, $A_2$. to the range is also shown, with it being understood that the intake valve profile is continuously variable, as represented by the line 44.

The shaded area of FIG. 4 shows a particular sub-range of compression ratio, $\Delta CR$, necessary for auto-ignition. Selection of a particular intake valve profile for operating the intake valves via system 20 is determined by the air mass necessary for the combustion process at the current engine operating conditions (typically engine speed and engine load are the principal operating conditions that affect intake valve operation). Selection of a profile should also avoid the creation of a condition that would generate vacuum within a cylinder.

Figure 5:
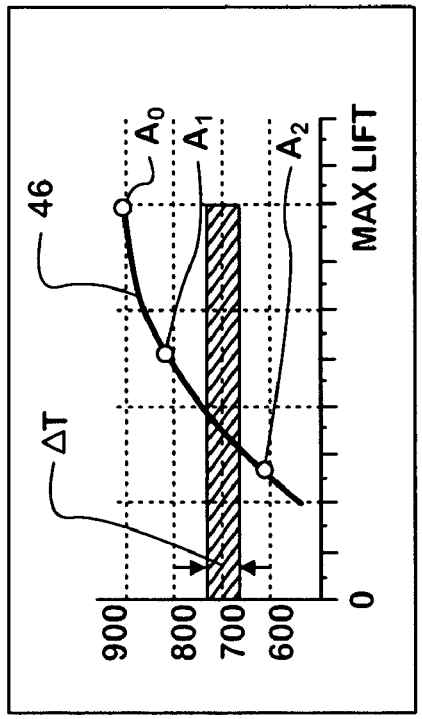
FIG. 5 is a graph plot showing certain relationships between in-cylinder temperature and the representative profiles of FIG. 3.

Similarly FIG. 5 illustrates the range of auto-ignition with respect to the relation between mixture temperature and intake valve lift. The correlation of each of the three intake valve profiles $A_0$, $A_1$, $A_2$ to the range is also shown, with the line 46 showing that the intake valve profile is continuously variable. Line 44 in FIG. 5 is representative of cycle simulation that has shown that advancing the timing of intake valve closing in the engine cycle (toward BDC and even earlier toward the non-firing TDC) lowers the in-cylinder temperatures.

Because commencement of combustion in an alternative diesel combustion process should occur at or near TDC with the temperature of the fuel-air mixture at a temperature within a range appropriate to the "cool flame" chemistry that characterizes such alternative processes, the valve profile selected should be one that provides that temperature. If mixture temperature at some predetermined number of degrees before TDC is one that falls with the shaded area of FIG. 5, cool-flame auto-ignition will commence at the proper time near or at TDC. Auto-ignition will begin somewhere between 600°–900° K. At around 600° K there is a 'cool reaction' that is characteristic of Diesel or high Cetane number fuels, followed at 900° K by a hot flame reaction, typical of all hydrocarbon fuels (e.g. gasoline or Diesel alike).

Thus, controlling intake valve operation as described herein can zero in on a target $\Delta T$ range for in-cylinder temperature at a certain time in the engine cycle that will achieve the desired auto-ignition. By selecting a suitable valve profile, in-cylinder temperature near the end of the compression stroke can be controlled in a manner that will support alternative diesel combustion in a way that reduces engine-out emissions like NOx and smoke. It is well known that limiting peak in-cylinder temperature is an effective way to limit NOx.

Figure 6:
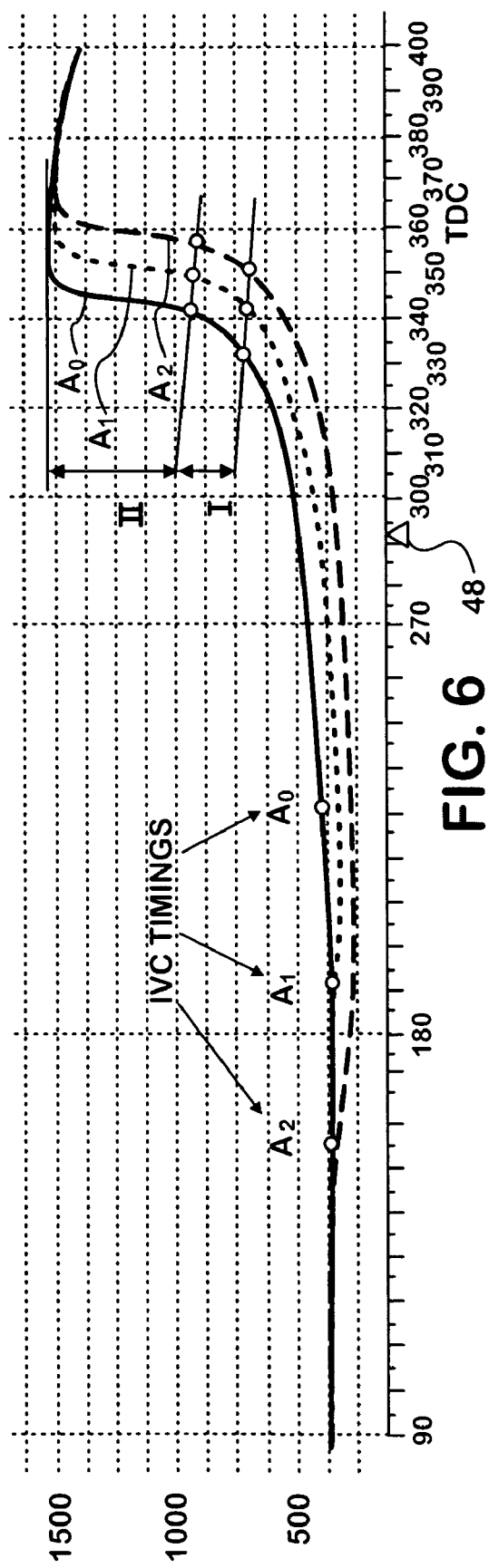
FIG. 6 is a graph plot showing in-cylinder temperature traces during a portion of an engine cycle for the representative profiles of FIG. 3.

FIG. 6 shows three in-cylinder temperature traces for the three valve profiles $A_0$, $A_1$, $A_2$. The triangle 48 indicates an example of typical in-cylinder injection timing near the beginning of the compression stroke. Alternatively, fuel might be injected in whole or in part upstream of the intake valves to create premixtures.

Zone I indicates the cool-flame combustion typical of higher cetane fuel such as Diesel, occurring at about 700° K. Zone II indicates the hot-flame combustion, typically at 1000° K, typical of carbon fuels such as Diesel or Gasoline. As illustrated, control of intake valve operation can control auto-ignition. That is, intake valve control (IVC) can bring the hot-flame combustion close to TDC for better combustion efficiency.

For implementing the invention in an engine, ECS 24 can have one or more maps that correlate various profiles like $A_0$, $A_1$, $A_2$ with various combinations of engine speed and engine load. Based on engine speed and engine load, and possibly other parameters as might be useful, a corresponding profile will be selected.

While a presently preferred embodiment of the invention has been illustrated and described, it should be appreciated that principles of the invention apply to all embodiments falling within the scope of the following claims.

What is claimed is:
1. A compression ignition engine comprising:
   cylinders within which combustion occurs to run the engine;
   a fueling system for fueling the cylinders;
   an intake system for introducing charge air into the cylinders, including a variable valve actuation system that controls operation of intake valves that open and close the intake system to individual engine cylinders;

a processor-based engine control system controlling both the fueling system and the variable valve actuation system by processing certain data to develop fueling data for fueling the engine cylinders and intake valve operating data for operating the cylinder intake valves;

wherein the intake valve operating data is developed by execution of an algorithm in the control system that controls ECR of the cylinders for causing commencement of auto-ignition of fuel in the cylinders to occur during compression strokes in advance of top dead center at in-cylinder temperatures within a defined temperature range.

2. An engine as set forth in claim 1 wherein the execution of the algorithm causes the variable valve actuation system to begin opening the intake valves at or near the beginning of intake strokes immediately preceding the compression strokes and to close the intake valves before the conclusion of the intake strokes.

3. An engine as set forth in claim 2 wherein the execution of the algorithm causes the variable valve actuation system to close the intake valves sufficiently before the conclusion of the intake strokes to allow expansion of in-cylinder air during the remainder of the intake strokes sufficient to create some decrease in in-cylinder temperature.

4. An engine as set forth in claim 1 wherein the certain data processed to develop both fueling data and intake valve operating data comprises data that includes engine speed data and engine load data.

5. An engine as set forth in claim 1 wherein some values of the certain data, the execution of the algorithm causes the intake valves to have relatively smaller lift and relatively earlier closing time during the engine cycle, and for other values of the certain data, the execution of the algorithm causes the intake valves to have relatively larger lift and relatively later closing time during the engine cycle.

6. An engine as set forth in claim 1 wherein the certain data processed to develop both fueling data and intake valve operating data comprises data that includes engine speed data and engine load data, and some values of engine speed data and engine load data, the execution of the algorithm causes the intake valves to have relatively smaller lift and relatively earlier closing time during the engine cycle, and for other values of engine speed data and engine load data, the execution of the algorithm causes the intake valves to have relatively larger lift and relatively later closing time during the engine cycle.

7. An engine as set forth in claim 1 including a turbocharger that has a compressor in the intake system for imparting boost to the charge air entering the cylinders.

8. A method of operating a compression ignition engine that has a processor-based engine control system controlling both a fueling system for fueling the engine and a variable valve actuation system that controls operation of intake valves that open and close an intake system to individual engine cylinders, the method comprising:

processing certain data to develop both fueling data for fueling an engine cylinder and intake valve operating data for operating an intake valve for the cylinder;

wherein the intake valve operating data is developed by execution of an algorithm in the control system that controls ECR of the cylinder for causing commencement of auto-ignition of fuel in the cylinder to occur during a compression stroke in advance of top dead center at an in-cylinder temperature within a defined temperature range;

fueling the cylinder according to the fueling data; and operating the variable valve actuation system according to the intake valve operating data to allow air to pass from the intake system through the intake valve into the cylinder in an amount that causes commencement of auto-ignition of fuel in the cylinder to occur during the compression stroke in advance of top dead center at an in-cylinder temperature within the defined temperature range.

9. A method as set forth in claim 8 wherein the step of operating the variable valve actuation system according to the intake valve operating data to allow air to pass from the intake system through the intake valve into the cylinder in an amount that causes commencement of auto-ignition of fuel in the cylinder to occur in advance of top dead center at an in-cylinder temperature within the defined temperature range comprises operating the variable valve actuation system to begin opening the intake valve at or near the beginning of an intake stroke immediately preceding the compression stroke and to close the intake valve before the conclusion of the intake stroke.

10. A method as set forth in claim 9 wherein the step of operating the variable valve actuation system to close the intake valve before the conclusion of the intake stroke comprises closing the intake valve sufficiently before the conclusion of the intake stroke to allow expansion of in-cylinder air during the remainder of the intake stroke sufficient to create some decrease in in-cylinder temperature.

11. A method as set forth in claim 8 wherein the step of processing certain data to develop both fueling data for fueling an engine cylinder and intake valve operating data for operating an intake valve for the cylinder comprises processing data that includes engine speed data and engine load data.

12. A method as set forth in claim 8 wherein the step of operating the variable valve actuation system according to the intake valve operating data to allow air to pass from the intake system through the intake valve into the cylinder in an amount that causes commencement of auto-ignition of fuel in the cylinder to occur during the compression stroke in advance of top dead center at an in-cylinder temperature within the defined temperature range comprises for some values of the certain data processed during the processing step, causing the intake valve to have relatively smaller lift and relatively earlier closing time during the engine cycle, and for other values of the certain data processed during the processing step, causing the intake valve to have relatively larger lift and relatively later closing time during the engine cycle.

13. A method as set forth in claim 8 wherein the step of processing certain data to develop both fueling data for fueling an engine cylinder and intake valve operating data for operating an intake valve for the cylinder comprises processing data that includes engine speed data and engine load data, and the step of operating the variable valve actuation system according to the intake valve operating data to allow air to pass from the intake system through the intake valve into the cylinder in an amount that causes commencement of auto-ignition of fuel in the cylinder to occur during the compression stroke in advance of top dead center at an in-cylinder temperature within the defined temperature range comprises for some values of engine speed data and engine load data processed during the processing step, causing the intake valve to have relatively smaller lift and relatively earlier closing time during the engine cycle, and for other values of engine speed data and engine load data processed during the processing step, causing the intake valve to have relatively larger lift and relatively later closing time during the engine cycle.

* * * * *